(12) United States Patent
An et al.

(10) Patent No.: US 12,149,551 B2
(45) Date of Patent: Nov. 19, 2024

(54) LOG ANOMALY DETECTION IN CONTINUOUS ARTIFICIAL INTELLIGENCE FOR IT OPERATIONS

(71) Applicant: International Business Machines Corporation, Armonk, NY (US)

(72) Inventors: Lu An, Raleigh, NC (US); An-Jie Andy Tu, Campbell, CA (US); Xiaotong Liu, San Jose, CA (US); Anbang Xu, San Jose, CA (US); Rama Kalyani T. Akkiraju, Cupertino, CA (US); Neil H. Boyette, Oregon City, OR (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 17/930,729

(22) Filed: Sep. 9, 2022

(65) Prior Publication Data

US 2024/0089275 A1 Mar. 14, 2024

(51) Int. Cl.
*H04L 9/40* (2022.01)
*G06F 11/16* (2006.01)
(Continued)

(52) U.S. Cl.
CPC .......... *H04L 63/1425* (2013.01); *G06F 11/16* (2013.01); *G06F 18/2411* (2023.01);
(Continued)

(58) Field of Classification Search
CPC ............. H04L 63/1425; H04L 41/0627; H04L 41/0645; H04L 43/0817; H04L 41/082;
(Continued)

(56) References Cited

U.S. PATENT DOCUMENTS 8,495,429 B2 7/2013 Fu
9,754,020 B1 * 9/2017 Kosloski ............. G06F 16/3344
(Continued)

FOREIGN PATENT DOCUMENTS

CN 105812202 B 7/2016
CN 110058977 B 7/2019
(Continued)

OTHER PUBLICATIONS

"IBM Cloud Pak for Watson AIOps 3.2 delivers new features and enhancements to integrate with existing ChatOps platforms", Grace Period Disclosure, IBM United States Software Announcement 221-365, dated Nov. 2, 2021, 9 pages.
(Continued)

*Primary Examiner* — Aravind K Moorthy
(74) *Attorney, Agent, or Firm* — IBM Patents+ Team (57) ABSTRACT

A computer-implemented method, a computer program product, and a computer system for log anomaly detection. A computer receives a windowed log of incoming raw log messages. A computer compares statistical distribution metrics of entities in the windowed log with a statistical distribution extracted from a real-time statistical model for the entities. In response to the statistical distribution metrics being statistically different from the statistical distribution extracted from the real-time statistical model for the entities, a computer tags the windowed log as an entity anomaly. A computer computes a distance between an average word embedding vector in the windowed log and a statistical distribution extracted form a real-time statistical model for word embeddings. In response to the distance being greater than a predetermined threshold, a computer tags the windowed log as a word embedding anomaly. A computer sends to a user an alert with an anomaly severity level.

20 Claims, 5 Drawing Sheets

(51) Int. Cl.
*G06F 18/2411* (2023.01)
*H04L 41/0604* (2022.01)
*H04L 41/0631* (2022.01)
*H04L 43/0817* (2022.01)

(52) U.S. Cl.
CPC ...... *H04L 41/0627* (2013.01); *H04L 41/0645* (2013.01); *H04L 43/0817* (2013.01)

(58) Field of Classification Search
CPC ......... H04L 41/16; H04L 43/16; H04L 43/20; H04L 41/069; H04L 41/142; H04L 41/145; H04L 43/08; G06F 11/16; G06F 18/2411; G06F 11/3452; G06F 11/0751; G06F 11/3476; G06F 18/2433
See application file for complete search history.

(56) References Cited

U.S. PATENT DOCUMENTS

| | | | |
|---|---|---|---|
| 10,242,090 B1* | 3/2019 | Kosloski | G06F 16/93 |
| 10,530,795 B2 | 1/2020 | Pande | |
| 10,671,942 B1* | 6/2020 | McGovern | G06F 18/24 |
| 10,803,248 B1* | 10/2020 | Arfa | G06N 20/00 |
| 10,817,527 B1* | 10/2020 | Setlur | G06F 16/248 |
| 10,891,943 B2* | 1/2021 | Zhang | G06N 3/08 |
| 11,024,299 B1* | 6/2021 | Drake | G10L 15/197 |
| 11,030,539 B1* | 6/2021 | Arfa | G06F 40/295 |
| 11,086,919 B2 | 8/2021 | Parthasarathy | |
| 11,132,622 B2* | 9/2021 | Gopalakrishnan | G06N 5/022 |
| 11,182,806 B1* | 11/2021 | Arfa | G06Q 30/0201 |
| 11,237,897 B2 | 2/2022 | Bhatia | |
| 11,277,443 B2* | 3/2022 | Onut | H04L 63/0227 |
| 11,392,651 B1* | 7/2022 | McClusky | G06F 16/906 |
| 11,461,668 B1* | 10/2022 | Mohandas | G06F 40/30 |
| 11,526,508 B1* | 12/2022 | McCallie, Jr | G06F 40/284 |
| 11,538,467 B1* | 12/2022 | Feyisetan | G10L 15/1815 |
| 11,544,460 B1* | 1/2023 | Margolin | G06F 40/151 |
| 11,552,876 B1* | 1/2023 | Zhang | H04L 45/28 |
| 11,645,479 B1* | 5/2023 | Coursey | G06F 40/58 704/9 |
| 11,734,358 B2* | 8/2023 | Tory | G06F 3/04847 715/744 |
| 11,756,049 B1* | 9/2023 | Shankar | G06Q 30/0206 705/7.35 |
| 11,870,659 B1* | 1/2024 | Crafford | H04L 12/40 |
| 11,972,211 B1* | 4/2024 | Singh | G06F 40/284 |
| 12,028,362 B1* | 7/2024 | Cui | H04L 63/1416 |
| 2012/0288207 A1* | 11/2012 | Sun | G06F 16/353 382/224 |
| 2013/0346147 A1* | 12/2013 | Vellozo Luz | G06Q 30/0201 705/7.29 |
| 2016/0063354 A1* | 3/2016 | Reese | G06T 7/70 382/182 |
| 2016/0191561 A1 | 6/2016 | Eskin | |
| 2016/0219067 A1 | 7/2016 | Han | |
| 2016/0366033 A1* | 12/2016 | Lange | H04L 43/08 |
| 2017/0060854 A1* | 3/2017 | Zeng | G06F 40/30 |
| 2017/0109648 A1* | 4/2017 | Shmueli | G06N 20/00 |
| 2017/0139806 A1* | 5/2017 | Xu | G06F 11/3612 |
| 2018/0129579 A1 | 5/2018 | Debnath | |
| 2018/0157644 A1* | 6/2018 | Mandt | G06N 3/045 |
| 2018/0219723 A1* | 8/2018 | Scarpelli | G06F 21/552 |
| 2018/0248905 A1 | 8/2018 | Cote | |
| 2018/0329932 A1 | 11/2018 | Chen | |
| 2018/0357292 A1* | 12/2018 | Rai | G06F 16/2455 |
| 2019/0005019 A1* | 1/2019 | Burke | G06F 40/284 |
| 2019/0156061 A1* | 5/2019 | Chakraborty | H04L 63/0421 |
| 2019/0278850 A1* | 9/2019 | Atasu | G06F 16/3347 |
| 2019/0303567 A1* | 10/2019 | Batmaz | G06N 3/088 |
| 2019/0332705 A1* | 10/2019 | Bordawekar | G06N 20/00 |
| 2019/0392082 A1* | 12/2019 | Bell | G06N 3/08 |
| 2020/0026753 A1* | 1/2020 | Beaver | G06F 40/253 |
| 2020/0184355 A1* | 6/2020 | Mehta | G06F 11/3476 |
| 2020/0226288 A1* | 7/2020 | Zhang | G06N 3/04 |
| 2020/0250537 A1* | 8/2020 | Li | G06F 16/538 |
| 2020/0272696 A1* | 8/2020 | Muraoka | G06F 40/30 |
| 2020/0293653 A1 | 9/2020 | Huang | |
| 2020/0364507 A1* | 11/2020 | Berry | G06F 18/217 |
| 2020/0394186 A1* | 12/2020 | Domeniconi | G06F 16/3344 |
| 2020/0394269 A1* | 12/2020 | Seibel | G06F 40/284 |
| 2021/0004437 A1* | 1/2021 | Zhang | G06F 40/205 |
| 2021/0067532 A1* | 3/2021 | Bruno | H04L 63/1425 |
| 2021/0073199 A1* | 3/2021 | Bettaglio | G06N 7/00 |
| 2021/0089904 A1* | 3/2021 | Chung | G06N 3/044 |
| 2021/0136096 A1* | 5/2021 | Janakiraman | H04L 63/1425 |
| 2021/0166080 A1* | 6/2021 | Podder | G06F 18/217 |
| 2021/0200745 A1* | 7/2021 | Bui | G06F 16/215 |
| 2021/0232911 A1* | 7/2021 | Velagapudi | G06N 3/08 |
| 2021/0264115 A1* | 8/2021 | Wang | G06F 16/26 |
| 2021/0286945 A1* | 9/2021 | Nagar | G06N 20/00 |
| 2021/0288971 A1* | 9/2021 | Karlberg | H04L 63/105 |
| 2021/0304253 A1* | 9/2021 | Kumbi | G06F 40/30 |
| 2021/0342375 A1* | 11/2021 | Pei | G06F 16/353 |
| 2021/0365643 A1* | 11/2021 | Agrawal | G06N 20/00 |
| 2021/0374187 A1* | 12/2021 | Miller | G06F 16/3347 |
| 2021/0391080 A1* | 12/2021 | Fan | G06F 40/295 |
| 2022/0043848 A1* | 2/2022 | Hsiao | G06F 16/355 |
| 2022/0171798 A1* | 6/2022 | Wang | G06F 16/353 |
| 2022/0172713 A1* | 6/2022 | Kwatra | G06F 40/232 |
| 2022/0207050 A1* | 6/2022 | Awadhwal | G06Q 30/016 |
| 2022/0215287 A1* | 7/2022 | Klaiman | G06N 3/088 |
| 2022/0294757 A1* | 9/2022 | Khasanova | H04L 61/4511 |
| 2022/0300762 A1* | 9/2022 | Hasegawa | G06V 10/945 |
| 2022/0391690 A1* | 12/2022 | Wang | G06Q 10/1053 |
| 2023/0034153 A1* | 2/2023 | Azuma | G06F 40/30 |
| 2023/0042683 A1* | 2/2023 | Tian | G06F 16/3344 |
| 2023/0065915 A1* | 3/2023 | Berestovsky | G06V 30/1448 |
| 2023/0074653 A1* | 3/2023 | Mawson | G06Q 20/0855 |
| 2023/0098812 A1* | 3/2023 | Rivlin | H04L 63/0236 726/22 |
| 2023/0127652 A1* | 4/2023 | Pouran Ben Veyseh | G06N 3/0895 704/9 |
| 2023/0196016 A1* | 6/2023 | Horesh | G06F 40/232 715/256 |
| 2023/0206010 A1* | 6/2023 | Luan | G06F 40/258 704/9 |
| 2023/0206666 A1* | 6/2023 | Dey | G06V 30/19093 382/181 |
| 2023/0214369 A1* | 7/2023 | Richardson | G06F 40/40 707/692 |
| 2023/0297880 A1* | 9/2023 | Asthana | G06F 40/216 706/12 |
| 2023/0334070 A1* | 10/2023 | Gullapudi | G06F 40/284 |
| 2023/0418880 A1* | 12/2023 | Roy | G06F 16/3344 |
| 2024/0005094 A1* | 1/2024 | Nir | G06F 16/367 |
| 2024/0028646 A1* | 1/2024 | Ramsl | G06F 16/9024 |
| 2024/0037326 A1* | 2/2024 | Vargas | G06F 40/194 |
| 2024/0078372 A1* | 3/2024 | Zhang | G06F 40/284 |

FOREIGN PATENT DOCUMENTS

| | | |
|---|---|---|
| CN | 112948215 A | 6/2021 |
| CN | 113850070 A | 12/2021 |
| WO | 2021123924 A1 | 6/2021 |

OTHER PUBLICATIONS

Decker et al., "Real-Time Anomaly Detection in Data Centers for Log-based Predictive Maintenance using an Evolving Fuzzy-Rule-Based Approach", arXiv:2004.13527v1 {cs.AI} Apr. 25, 2020, 9 pages.

Huang et al., "HitAnomaly: Hierarchical Transformers for Anomaly Detection in System Log", IEEE Transactions on Network and Service Management, vol. 17, No. 4, Dec. 2020, © 2020 IEEE, 13 pages.

Juvonen et al., "Online anomaly detection using dimensionality reduction techniques for HTTP log analysis", Computer Networks 91 (2015), Aug. 24, 2015, Elsevier, 11 pages.

(56) References Cited

OTHER PUBLICATIONS

Yang et al., "Semi-Supervised Log-Based Anomaly Detection via Probabilistic Label Estimation", accessed on Jul. 5, 2022, 13 pages.

* cited by examiner

LOG ANOMALY DETECTION IN CONTINUOUS ARTIFICIAL INTELLIGENCE FOR IT OPERATIONS

STATEMENT REGARDING PRIOR DISCLOSURES BY THE INVENTOR OR A JOINT INVENTOR

The following disclosure is submitted under 35 U.S.C. 102(b)(1)(A): DISCLOSURE: "IBM Cloud Pak for Watson AIOps 3.2 delivers new features and enhancements to integrate with existing ChatOps platforms", GRACE PERIOD DISCLOSURE, IBM United States Software Announcement 221-365, Nov. 2, 2021

BACKGROUND

The present invention relates generally to log anomaly detection in continuous artificial intelligence for IT operations (AIOps), and more particularly to real-time statistical model based log anomaly detection.

Anomaly detection from logs is a fundamental Information Technology Operations (ITOps) management task. It aims to detect anomalous system behavior's and find signals that can provide clues to the reasons and the anatomy of a system's failure. As system logs are records of system states and events at various critical points and log data is universally available in nearly all IT systems, it is a valuable resource for the AIOps to process, analyze, and perform anomaly detection algorithms. The traditional log anomaly detection (LAD) methods are mostly manual operations and rule-based methods, and such traditional methods are no longer suitable for the large-scale IT systems with sophisticated system incidents.

SUMMARY

In one aspect, a computer-implemented method for real-time statistical model based log anomaly detection is provided. The computer-implemented method includes receiving a windowed log of incoming raw log messages from a data source, where the windowed log is as an inference input for log anomaly detection. The computer-implemented method further includes comparing statistical distribution metrics of entities in the windowed log with a statistical distribution extracted from a real-time statistical model for the entities, where the entities are extracted from the incoming raw log messages and include message identifiers, log levels, error codes, and exception types. The computer-implemented method further includes, in response to determining the statistical distribution metrics of the entities being statistically different from the statistical distribution extracted from the real-time statistical model for the entities, tagging the windowed log as an entity anomaly. The computer-implemented method further includes computing a distance between an average word embedding vector in the windowed log and a statistical distribution extracted form a real-time statistical model for word embeddings. The computer-implemented method further includes, in response to determining the distance being greater than a predetermined threshold of the distance, tagging the windowed log as a word embedding anomaly. The computer-implemented method further includes sending to a user an alert with an anomaly severity level.

In another aspect, a computer program product for real-time statistical model based log anomaly detection is provided. The computer program product comprises a computer readable storage medium having program instructions embodied therewith, and the program instructions are executable by one or more processors. The program instructions are executable to: receive a windowed log of incoming raw log messages from a data source, where the windowed log is as an inference input for log anomaly detection; compare statistical distribution metrics of entities in the windowed log with a statistical distribution extracted from a real-time statistical model for the entities, where the entities are extracted from the incoming raw log messages and include message identifiers, log levels, error codes, and exception types; in response to determining the statistical distribution metrics of the entities being statistically different from the statistical distribution extracted from the real-time statistical model for the entities, tag the windowed log as an entity anomaly; compute a distance between an average word embedding vector in the windowed log and a statistical distribution extracted form a real-time statistical model for word embeddings; in response to determining the distance being greater than a predetermined threshold of the distance, tag the windowed log as a word embedding anomaly; and send to a user an alert with an anomaly severity level.

In yet another aspect, a computer system for real-time statistical model based log anomaly detection is provided. The computer system comprises one or more processors, one or more computer readable tangible storage devices, and program instructions stored on at least one of the one or more computer readable tangible storage devices for execution by at least one of the one or more processors. The program instructions are executable to receive a windowed log of incoming raw log messages from a data source, where the windowed log is as an inference input for log anomaly detection. The program instructions are further executable to compare statistical distribution metrics of entities in the windowed log with a statistical distribution extracted from a real-time statistical model for the entities, where the entities are extracted from the incoming raw log messages and include message identifiers, log levels, error codes, and exception types. The program instructions are further executable to, in response to determining the statistical distribution metrics of the entities being statistically different from the statistical distribution extracted from the real-time statistical model for the entities, tag the windowed log as an entity anomaly. The program instructions are further executable to compute a distance between an average word embedding vector in the windowed log and a statistical distribution extracted form a real-time statistical model for word embeddings. The program instructions are further executable to, in response to determining the distance being greater than a predetermined threshold of the distance, tag the windowed log as a word embedding anomaly. The program instructions are further executable to send to a user an alert with an anomaly severity level.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
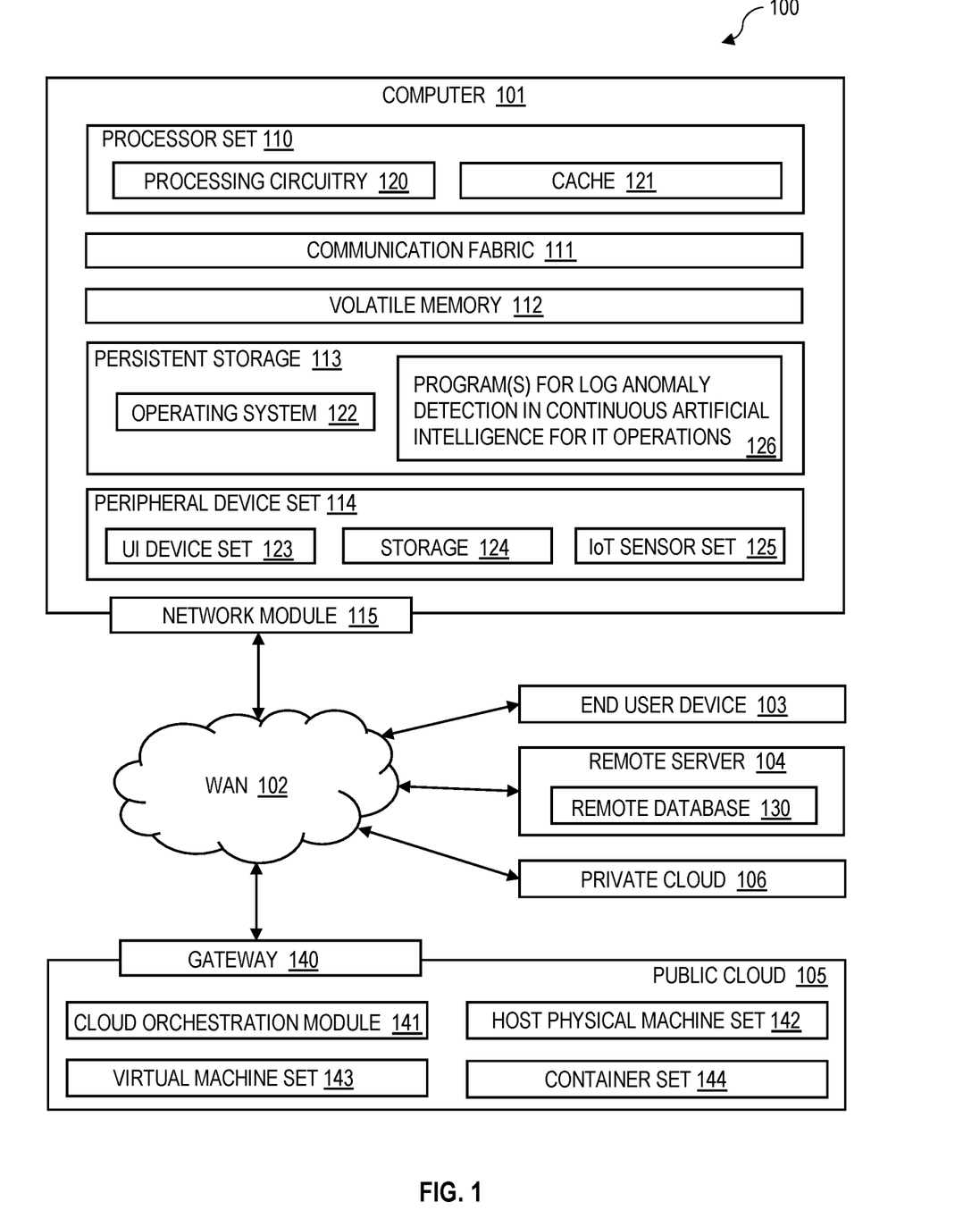
FIG. 1 is a diagram illustrating an example of an environment for the execution of at least some of computer code involved in performing real-time statistical model based log anomaly detection in continuous artificial intelligence for IT operations, in accordance with one embodiment of the present invention.

In FIG. 1, computing environment 100 contains an example of an environment for the execution of at least some of the computer code involved in performing the inventive methods, such as program(s) 126 for real-time statistical model based log anomaly detection. In addition to program(s) 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 126, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 126 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In recent years, machine learning based anomaly detection methods have received more and more attention. For instance, some works utilize unsupervised clustering-based methods to detect outliers. Though such methods do not require labeled data for training, the anomaly detection performance is not guaranteed and unstable. Moreover, it is hard to apply such methods onto streaming log data as log patterns are changing over time. Another log anomaly detection (LAD) approach is to first collect enough labeled training data during a system's normal operation period and adopt log templates-based method for feature engineering, and then employ principal component analysis (PCA) based methods to learn normal log patterns from labeled training data and find anomalous log patterns during inference streaming log data. However, PCA-based methods still suffer from some limitation in practice. Firstly, log templates learning often requires customers to provide one week's worth of training logs without incidents which may need some time to collect thus training data is not available on day 0. Moreover, the customers sometimes may not know whether the training logs they provided are pure normal logs. Secondly, the log templates learning process takes hours or days to finish, depending on the size of the datasets.

Limitations of the existing solutions are as follows. (1) Existing log anomaly detection methods adopts rule-based methods are not suitable for the large-scale IT systems with sophisticated system incidents. (2) Existing log anomaly detection methods using unsupervised machine learning methods have low detection accuracy, high false positive rate. In addition, unsupervised learning methods cannot be applied to streaming log data as the log patterns are changing over time. (3) Existing log anomaly detection methods utilizing supervised machine learning methods need users to provide large number of labeled logs as training data, which is time consuming and sometime the training data may be contaminated due to the miss labeling issue. (4) Existing log anomaly detection methods utilizing PCA based methods need a very good templates learning process, which takes a long time to get qualified templates. Moreover, to capture the latest changing patterns of logs, PCA-based LAD methods need frequent reschedule on the training, while each round of the retraining takes a long time to finish. (5) Existing log anomaly detection with simple statistical learning methods for real-time detection can only indicate whether a system is stable or not but cannot show clues for the underlying types of system errors. Moreover, such methods do not support continuous model updating to the latest log pattern changes.

To address the above issues, embodiments of the present invention propose real-time statistical models (RSMs) based LAD method, which aims to reduce training time and achieve faster "time-to-value" while performing excellent online anomaly detection. Embodiments of the present invention introduce a fast error entity extraction method to extract different types of error entities including error codes and exceptions at run-time. In addition, this method is able to quickly categorize if an incoming log contains any faults. Instead of utilizing log templates for feature engineering, the RSM algorithm adopts the extracted error entities and encoded word-embeddings to build feature count vectors to learn normal log patterns. The proposed RSM methods is able to keep the model up-to-date by kick-starting the accumulative retraining periodically, so that the model is able to continuously improve itself by learning from more and more log data. Embodiments of the present invention introduce an automatic skipping mechanism in the model updating which can help avoid biased model generated by contaminated log data.

Unique features of embodiments of the present invention are summarized as follows. (1) The present invention adopts a fast entity-extraction method and a word embedding method to create feature count vectors in real-time. (2) The present invention eliminates the requirement of large amount of off-line training data and provides anomaly prediction results immediately for certain types of logs, for example, logs from specific IBM products (e.g., WebSphere, MQ which is a family of message-oriented middleware products, and Db2 which is a family of data management products). Inference can be performed immediately as a result of the domain knowledge from these IBM specific products. The present invention provides prediction results after about 30 minutes for other types of logs. This significantly reduce the human efforts on collecting and labelling large amount of training data. (3) The present invention supports accumulative and continuous model updating which is adaptive to changing patterns in real-time, and improves the robustness of the detection results. (4) The present invention automatically identifies incident periods and skips using contaminated log data, or skips using log data that is contaminated; therefore, the present invention avoids biased models, reduce false positives, and improves the fidelity of the detection results. (5) The present invention ensembles the detection results from RSM-entity and RSM-embedding methods, so that the present invention can assign different severity levels to alerts and help a site reliability engineering (SRE) team to prioritize the tickets.

Figure 2:
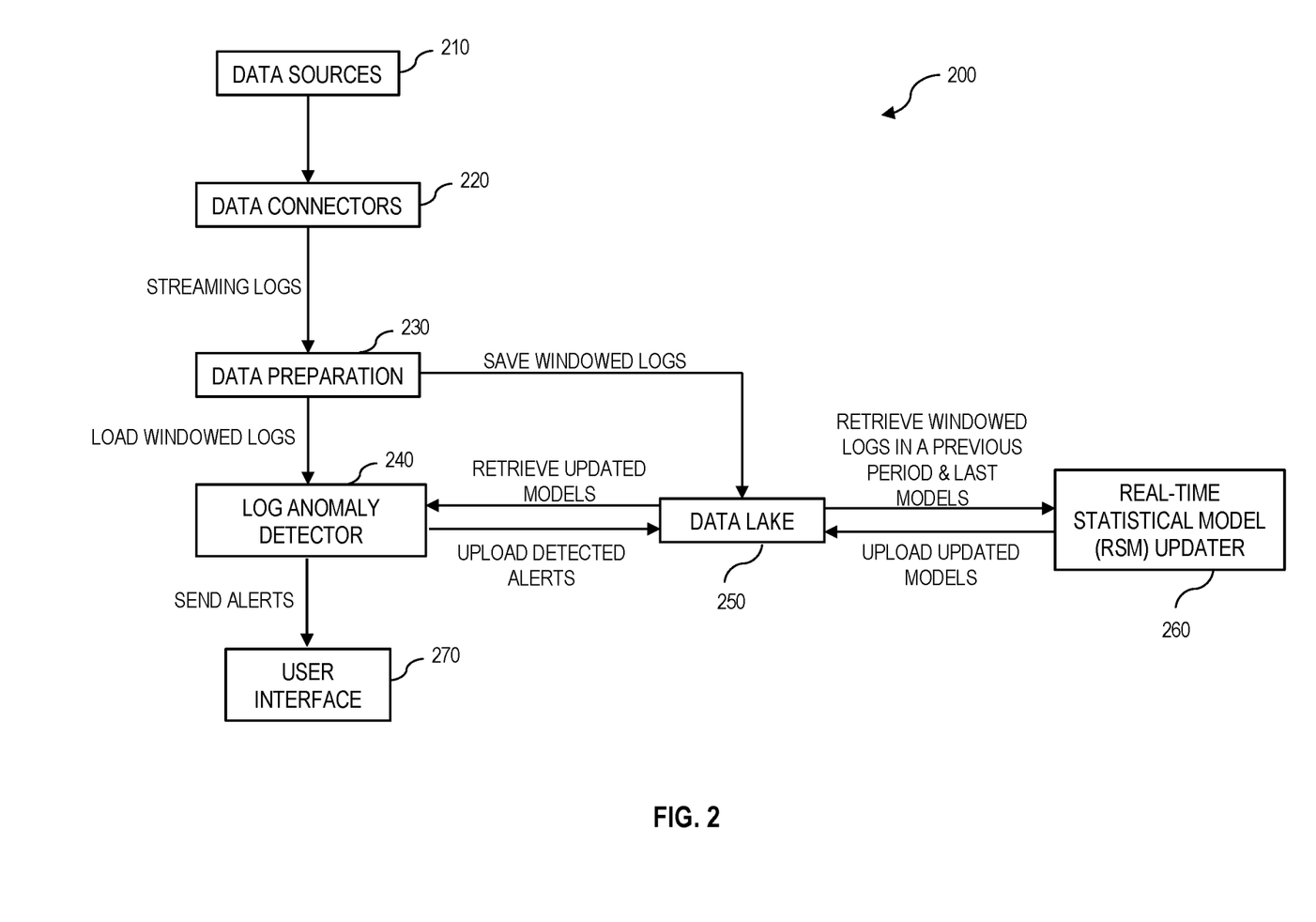
FIG. 2 is a diagram illustrating a system for real-time statistical model based log anomaly detection in continuous artificial intelligence for IT operations, in accordance with one embodiment of the present invention.

FIG. 2 is a diagram illustrating system 200 for real-time statistical model based log anomaly detection in continuous artificial intelligence for IT operations, in accordance with one embodiment of the present invention. System 200 includes data connectors 220 which query streaming logs from data sources 210 and send streaming logs to data preparation component 230 in a log anomaly detection pipeline. One example of data sources 210 is IBM WebSphere.

Data preparation component 230 normalizes incoming raw log messages. In normalizing the incoming raw log messages, data preparation component 230 performs log entity extraction to extract all the entities; for example, the entities include message IDs, log levels, error codes, and exception types. Data preparation component 230 also identifies whether the incoming raw log messages contain any negative sentiment keywords. The extracted entities are tagged as features for each incoming raw log message. In normalizing the incoming raw log messages, data preparation component 230 further utilizes word-embeddings (for example, fastText, a library for learning of word embeddings and text classification) to generate an embedding vector as another encoded feature of each incoming raw log message.

In normalizing the incoming raw log messages, data preparation component 230 performs windowing to the incoming raw log messages and generates one windowed log for each batch of the incoming raw log messages. For example, each batch contains all the raw log messages in a 10 second time window. In one windowed log for a batch of the incoming raw log messages, all the extracted entities are aggregated so that each possible entity has its unique entity name and a total count which shows a frequency of this entity happening during this batch of the incoming raw log messages. Similarly, in one windowed log for a batch of incoming raw log messages, word embedding vectors of all raw log messages are averaged to get an average word embedding vector which can represent the one windowed log. Thus, the one windowed log contains names of respective entities and counts corresponding to the names of the respective entities and further contains an average word embedding vector. Operational steps of data preparation by data preparation component 230 will be described in detail in later paragraphs with reference to a flowchart in FIG. 3.

As shown in FIG. 2, system 200 further include log anomaly detector 240 and data lake 250 (for example elasticsearch). Data preparation component 230 sends generated windowed logs to log anomaly detector 240 as inference inputs, and, at the same time, data preparation component 230 sends generated windowed logs to data lake 250 for storage.

Log anomaly detector 240 retrieves, from data lake 250, updated real-time statistical entity models (RSMs), including an updated real-time statistical model for entities (RSM for entities) and an updated real-time statistical model for word embeddings (RSM for word embeddings). Log anomaly detector 240 extracts a statistical distribution of the entities from the updated RSM for entities and a statistical distribution of the word embedding vectors from the updated RSM for word embeddings.

Log anomaly detector 240 receives, from data preparation component 230, the windowed logs as inference inputs, to detect anomalies in the windowed logs in a current time period. Each of the windowed logs contains counts of the respective entities and an average word embedding vector.

For each of the windowed logs in the current time period, log anomaly detector 240 performs a z-score test by comparing the statistical distribution metrics in a windowed log with the statistical distribution extracted from the updated RSM for entities. Log anomaly detector 240 computes a p-value in the z-score test. If the p-value is less than a predetermined threshold, log anomaly detector 240 tags the windowed logs in the current time period as an entity anomaly. In general, if the statistical distribution metrics are statistically different from the statistical distribution extracted from the updated RSM for entities, log anomaly detector 240 tags the windowed log as an entity anomaly.

For each of the windowed logs, log anomaly detector 240 also conducts log anomaly detection by computing a distance, for example a Mahalanobis distance, between the average word vector in the windowed log and the statistical distribution of the word embedding vectors. If the distance (e.g., the Mahalanobis distance) is greater than a predetermined threshold, log anomaly detector 240 tags the windowed log as a word embedding anomaly.

Upon obtaining results of detecting the entity anomaly and detecting the word embedding anomaly, log anomaly detector 240 ensembles the results and assigns different anomaly severity levels for an alert. If the windowed log is tagged as either the entity anomaly or the word embedding anomaly, log anomaly detector 240 assigns an alert with a lower severity level and sends the alert to user interface 270. If the windowed log is tagged as both the entity anomaly and the word embedding anomaly, log anomaly detector 240 assigns an alert with a higher severity level and sends the alert to user interface 270. Users are able to view details of the alerts on user interface 270. If the windowed log is tagged as neither the entity anomaly nor the word embedding anomaly, log anomaly detector 240 does not send alert to user interface 270.

Upon completing the log anomaly detection for the current time period, log anomaly detector 240 uploads the results of detecting the entity anomaly and detecting the word embedding anomaly to data lake 250 and also uploads the alerts of the log anomaly detection to data lake 250.

Upon completing the log anomaly detection for the current time period, log anomaly detector 240 continues to receive windowed logs in a next time period and to execute steps of the log anomaly detection for the windowed logs in a next time period.

During the log anomaly detection for the current time period, log anomaly detector 240 uses the updated RSMs retrieved from data lake 250. Real-time statistical model (RSM) updater 260 in system 200 generates the updated RSMs and stores the updated RSMs to data lake 250. Generating the updated RSMs by RSM updater 260 is described in the following paragraphs.

RSM updater 260 computes an anomaly-to-windowed-log ratio, using inputs and outputs of the log anomaly detection in a previous time period. The previous time period is a predetermined length of time just prior to the current time period of the log anomaly detection. For example, the length of the previous time period is 30 minutes. The anomaly-to-windowed-log ratio is a ratio of a count of windowed logs tagged as anomalies to a total count of windowed logs in the previous time period, and the ratio provides information of a proportion of windowed logs tagged as anomalies.

If the ratio is greater than a predetermined threshold, then RSM updater 260 skips model updating for the current time period of the log anomaly detection. This automatic skipping mechanism is used to avoid biased models to be generated by contaminated log data. If the ratio is not greater than the predetermined threshold, then RSM updater 260 updates a most recent version of the RSMs.

From data lake 250, RSM updater 260 retrieves windowed logs in the previous time period along with the most recent version of the RSMs. For the windowed logs in the previous time period, RSM updater 260 accumulatively computes all statistical distribution metrics of entities, e.g., the mean, the standard deviation, the sample size, etc. Such updated statistical distribution information for entities is stored as an updated RSM for entities in data lake 250. Similarly, RSM updater 260 also updates the corresponding statistical distributions of the word embedding vectors, e.g., the mean vector, covariance matrix, etc. Such updated statistical distribution information for the embedding vectors is stored as an updated RSM for word embeddings in data lake 250.

The model updating runs in backend and periodically, when more and more log data comes in. The model updating keeps both the RSM for entities and the RSM for word embeddings up-to-date, and at the same time the above-mentioned condition of performing model updating keeps the models unbiased.

Figure 3:
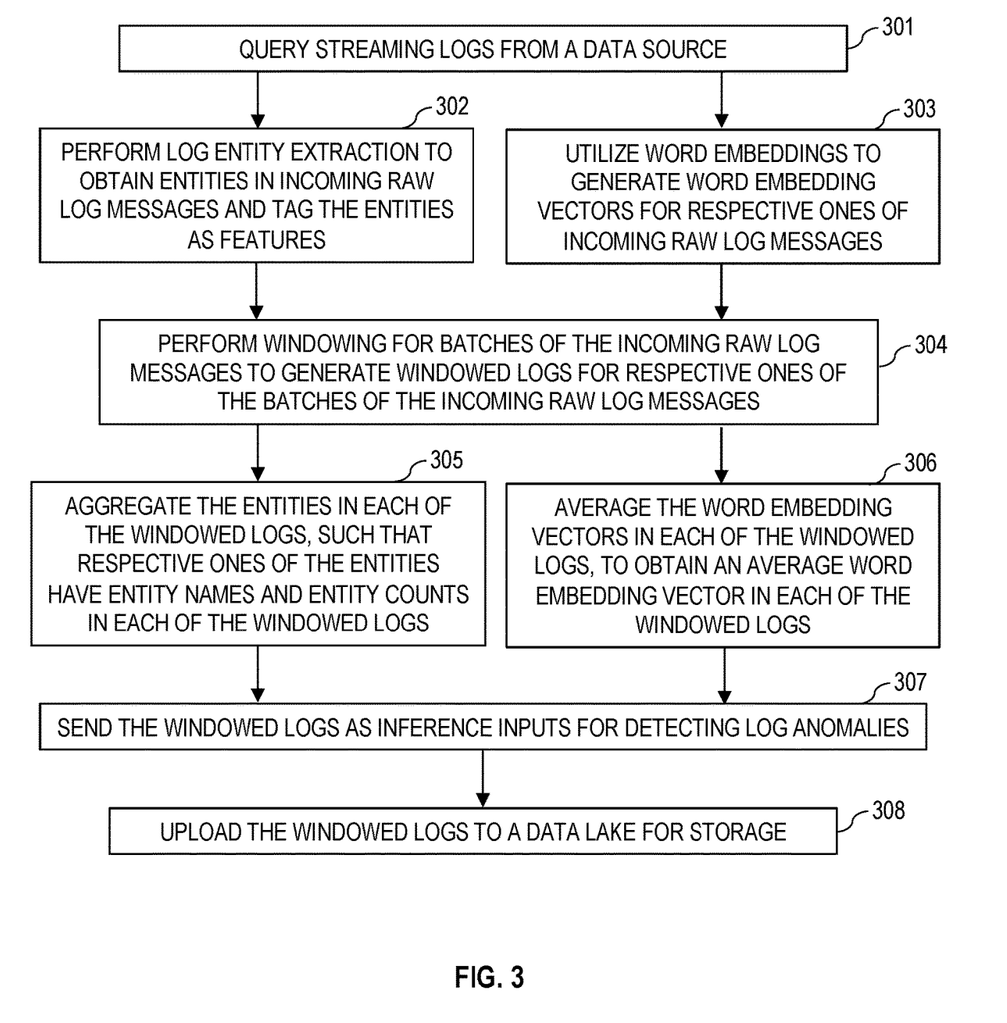
FIG. 3 is a flowchart showing operational steps of preparing data in real-time statistical model based log anomaly detection, in accordance with one embodiment of the present invention.

FIG. 3 is a flowchart showing operational steps of preparing data in real-time statistical model based log anomaly detection, in accordance with one embodiment of the present invention. The operational steps are implemented by a computer or server (such as computer 101 in FIG. 1).

In step 301, the computer or server queries streaming logs from a data source. The computer or server will prepare the streaming logs for log anomaly detection in later steps. In the example shown in FIG. 2, data connectors 220, which may be situated on the computer or server, query the streaming logs from data sources 210. For example, data sources 210 is IBM WebSphere. In the example shown in FIG. 2, data connectors 220 send the streaming logs to data preparation component 230, which may also be situated on the computer or server, for preparing data in real-time statistical model based log anomaly detection.

In step 302, the computer or server performs log entity extraction to obtain entities in incoming raw log messages and tags the entities as features for each of the incoming raw log messages. The entities include message IDs, log levels, error codes, and exception types. In the log entity extraction, the computer or server also identifies whether the log messages contain any negative sentiment keywords. In the example shown in FIG. 2, data preparation component 230 performs step 302.

Parallel to step 302, in step 303, the computer or server utilizes word embeddings to generate word embedding vectors for respective ones of incoming raw log messages. For example, fastText, a library for learning of word embeddings and text classification, is used for the word embeddings. For each of the incoming raw log messages, the computer or server generates a word embedding vector as another encoded feature. In the example shown in FIG. 2, data preparation component 230 performs step 303.

Following parallel step 302 and step 303, the computer or server, in step 304, performs windowing for batches of the incoming raw log messages to generate windowed logs for respective ones of the batches of the incoming raw log messages. A batch of the incoming raw log messages is a predetermined time window (e.g., 10 seconds); in other words, a windowed log has a predetermined time window (e.g., 10 seconds). In the example shown in FIG. 2, data preparation component 230 performs step 304.

In step 305, the computer or server aggregates the entities in each of the windowed logs, such that respective ones of the entities have entity names and entity counts in each of the windowed logs. Each possible entity has its unique entity name and a total count in a batch of the incoming raw log messages or in a windowed log; the total count shows a frequency of this entity happening during this batch or the windowed log. In the example shown in FIG. 2, data preparation component 230 performs step 305.

Parallel to step 305, in step 306, the computer or server averages the word embedding vectors in each of the windowed logs, to obtain an average word embedding vector in each of the windowed logs. The computer or server obtains average word embedding vectors for respective ones of the windowed logs. In the example shown in FIG. 2, data preparation component 230 performs step 306.

After step 305 and step 306, each of the windowed logs contains following features or information: names of respective entities, counts corresponding to the names of the respective entities, and an average word embedding vector.

Following parallel step 305 and step 306, the computer or server, in step 307, sends the windowed logs (which include the features or the information) as inference inputs for detecting log anomalies. In the example shown in FIG. 2, data preparation component 230 sends the windowed logs as the inference inputs to log anomaly detector 240 for detecting log anomalies. Operational steps of the detecting log anomalies will be discussed in later paragraphs with reference to FIG. 5.

In step 308, the computer or server uploads the windowed logs to a data lake for storage. In the example shown in FIG. 2, data preparation component 230 uploads the windowed logs to data lake 250.

Figure 4:
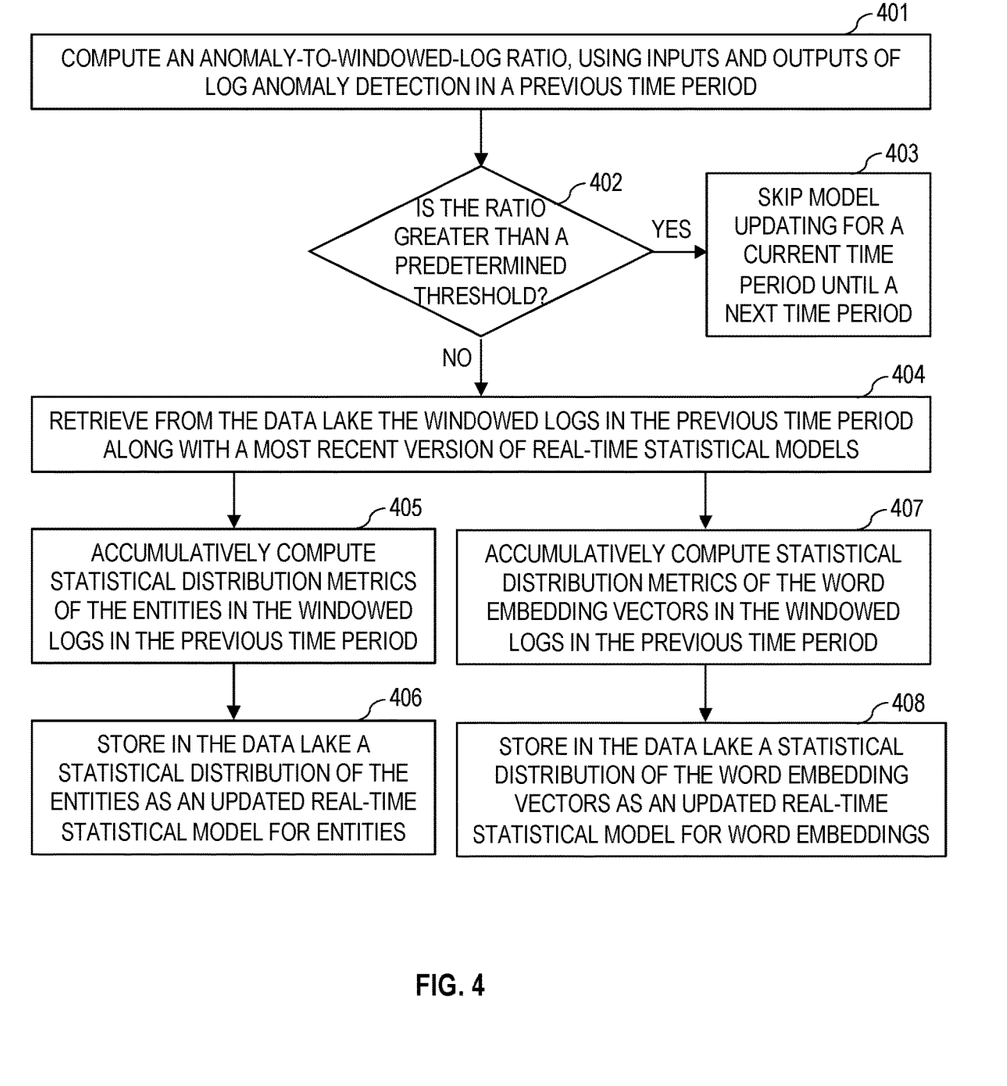
FIG. 4 is a flowchart showing operational steps of updating models in real-time statistical model based log anomaly detection, in accordance with one embodiment of the present invention.

FIG. 4 is a flowchart showing operational steps of updating models in real-time statistical model based log anomaly detection, in accordance with one embodiment of the present invention. The operational steps are implemented by a computer or server (such as computer 101 in FIG. 1).

In step 401, the computer or server computes an anomaly-to-windowed-log ratio, using inputs and outputs of log anomaly detection in a previous time period. The anomaly-to-windowed-log ratio is a ratio of a count of windowed logs tagged as anomalies to a total count of windowed logs, providing information of a proportion of windowed logs tagged as anomalies. The previous time period is with respect to a current time period of the log anomaly detection that is being conducted by the computer or server; in other words, the previous time period is a predetermined length of time just prior to the current time period. For example, the previous time period is 30 minutes. In the example shown in FIG. 2, RSM updater 260 (which is situated on the computer or server) uses the inputs and outputs of the log anomaly detection by log anomaly detector 240 in the previous time period.

In step 402, the computer or server determines whether the ratio is greater than a predetermined threshold of the ratio. In response to determining that the ratio is greater than the predetermined threshold of the ratio (YES branch of step 402), the computer or server in step 403 skips model updating for the current time period until a next time period of the log anomaly detection. This automatic skipping mechanism is used to avoid biased models to be generated by contaminated log data. In the example shown in FIG. 2, RSM updater 260 performs step 402 and step 403.

In response to determining that the ratio is not greater than the predetermined threshold of the ratio (NO branch of step 402), the computer or server in step 404 retrieves from the data lake the windowed logs in the previous time period along with a most recent version of real-time statistical models. The real-time statistical models include a real-time statistical model for entities (RSM for entities) and a real-time statistical model for word embeddings (RSM for word embeddings). The windowed logs in the previous time period is stored to the data lake by the computer or server in step 308 in FIG. 3. In the example shown in FIG. 2, RSM updater 260 retrieves from data lake 250 the windowed logs in the previous time period and the most recent version of the real-time statistical models. In the example shown in FIG. 2, the windowed logs in the previous time period is stored in data lake 250 by data preparation component 230.

In step 405, the computer or server accumulatively computes statistical distribution metrics of the entities in the windowed logs in the previous time period. The statistical distribution metrics of the entities include for example the mean, the standard deviation, the sample size, etc. Upon the statical distribution metrics of the entities being accumulatively computed, in step 406, the computer or server stores in the data lake a statistical distribution of the entities as an updated real-time statistical model for entities. The real-time statistical model for the entities is updated based on the statistical distribution metrics of the entities in the windowed logs in the previous time period. In the example shown in FIG. 2, RSM updater 260 performs step 405 and step 406.

Parallel to step 405, in step 407, the computer or server accumulatively computes statistical distribution metrics of the word embedding vectors in the windowed logs in the previous time period. The statistical distribution metrics of the word embedding vectors include for example the mean vector, covariance matrix, etc. Upon the statical distribution metrics of the word embedding vectors being accumulatively computed, in step 408, the computer or server stores in the data lake a statistical distribution of the word embedding vectors as an updated real-time statistical model for word embeddings. The real-time statistical model for the word embeddings is updated based on the statistical distribution metrics of the word embedding vectors in the windowed logs in the previous time period. In the example shown in FIG. 2, RSM updater 260 performs step 407 and step 408.

Figure 5:
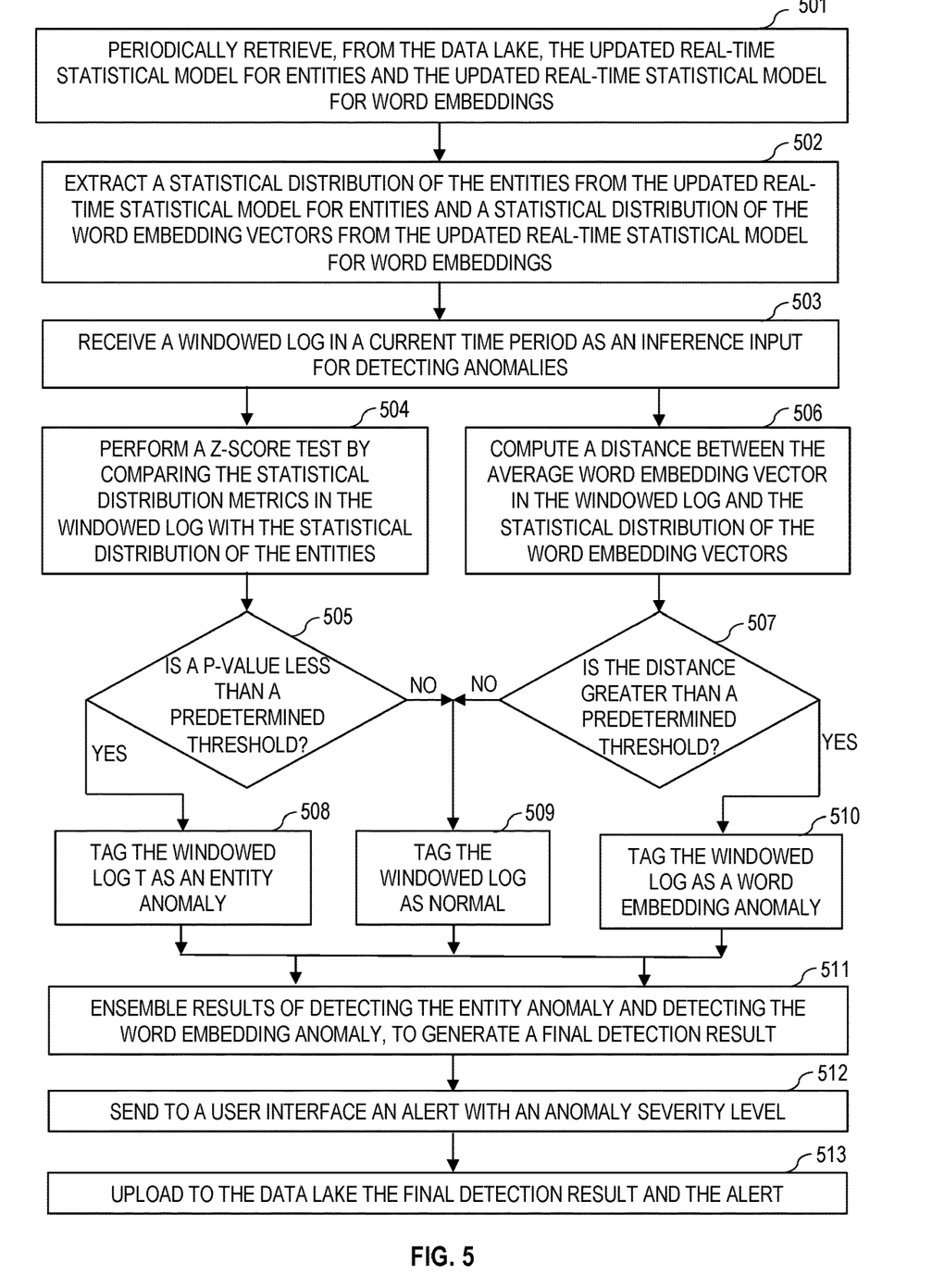
FIG. 5 is a flowchart showing operational steps of detecting log anomalies in real-time statistical model based log anomaly detection, in accordance with one embodiment of the present invention.

FIG. 5 is a flowchart showing operational steps of detecting log anomalies in real-time statistical model based log anomaly detection, in accordance with one embodiment of the present invention. The operational steps are implemented by a computer or server (such as computer 101 in FIG. 1).

In step 501, the computer or server periodically retrieves, from the data lake, the updated real-time statistical model for entities and the updated real-time statistical model for word embeddings. For example, the updated real-time statistical models are retrieved about every 30 minutes. The updated real-time statistical models are periodically retrieved from the data lake where the computer or server stores the updated real-time statistical models. The updated real-time statistical model for entities and the updated real-time statistical model for word embeddings have been obtained in steps 404-408 during updating models shown in FIG. 4. In the example shown in FIG. 2, log anomaly detector 240 retrieves the updated real-time statistical models from data lake 250.

Upon periodically retrieving the updated real-time statistical models in step 501, the computer or server, in step 502, extracts a statistical distribution of the entities from the updated real-time statistical model for entities and a statistical distribution of the word embedding vectors from the updated real-time statistical model for word embeddings. In the example shown in FIG. 2, log anomaly detector 240 performs step 502.

The log anomaly detection for one windowed log is implemented through steps 503-513. The computer or server iterates from step 503 to step 513 for all windowed logs of the incoming raw log messages. The following paragraphs describe the log anomaly detection for one windowed log.

In step 503, the computer or server receives a windowed log in a current time period as an inference input for detecting anomalies. Using the inference input that contains counts of the respective entities and an average embedding vector in the windowed log, the computer or server detects an anomaly in the windowed log. In the example shown in FIG. 2, log anomaly detector 240 receives the windowed log from data preparation component 230.

In step 504, the computer or server performs a z-score test by comparing the statistical distribution metrics in the windowed log with the statistical distribution of the entities. The statistical distribution of the entities is extracted from the updated real-time statistical model for entities at step 502. In step 505, the computer or server determines whether a p-value in the z-score test is less than a predetermined threshold of the p-value. In general, the computer or server tests whether the statistical distribution metrics are statistically different from the statistical distribution extracted from the updated real-time statistical model for entities. In the example shown in FIG. 2, log anomaly detector 240 performs step 504 and step 505.

Parallel to step 504 and step 505, in step 506, the computer or server computes a distance between the average word vector in the windowed log and the statistical distribution of the word embedding vectors. The statistical distribution of the word embedding vectors is extracted from the updated real-time statistical model for word embeddings. For example, a Mahalanobis distance is computed. In step 507, the computer or server determines whether the distance is greater than a predetermined threshold of the distance. In the example shown in FIG. 2, log anomaly detector 240 performs step 506 and step 507.

In response to determining that the p-value in the z-score test is less than the predetermined threshold of the p-value or the statistical distribution metrics are statistically different from the statistical distribution extracted from the updated real-time statistical model for entities (YES branch of step 505), at step 508, the computer or server tags the windowed log as an entity anomaly. In response to determining that the p-value in the z-score test is not less than the predetermined threshold of the p-value or the statistical distribution metrics is not statistically different from the statistical distribution extracted from the updated real-time statistical model for entities (NO branch of step 505), at step 509, the computer or server tags the windowed log as normal. In the example shown in FIG. 2, log anomaly detector 240 performs step 508 and step 509.

In response to determining that the distance is greater than the predetermined threshold of the distance (YES branch of step 507), at step 510, the computer or server tags the windowed log as a word embedding anomaly. In response to determining that the distance is not greater than the predetermined threshold of the distance (NO branch of step 507), at step 509, the computer or server tags the windowed log as normal. In the example shown in FIG. 2, log anomaly detector 240 performs step 510.

At step 511, the computer or server ensembles results of detecting the entity anomaly (through steps 504, 505, 508, and 509) and detecting the word embedding anomaly (through steps 506, 507, 509, and 510), to generate a final detection result. In the example shown in FIG. 2, log anomaly detector 240 performs step 511.

In response to determining that the windowed log is tagged as either the entity anomaly or the word embedding anomaly, the computer or server assigns an alert with a lower severity level. In response to determining that the windowed log is tagged as both the entity anomaly and the word embedding anomaly, the computer or server assigns an alert with a higher severity level. At step 512, the computer or server sends to a user interface an alert with an anomaly severity level. In the example shown in FIG. 2, log anomaly detector 240 sends an alert with an anomaly severity level to user interface 270.

At step 513, the computer or server uploads to the data lake the final detection result and the alert. The final detection result and the alert stored in the data lake will be used by the computer or server for model updating. In the example shown in FIG. 2, log anomaly detector 240 uploads the final detection result and the alert to data lake 250.

What is claimed is:

1. A computer-implemented method for real-time statistical model based log anomaly detection, the method comprising:
   receiving a windowed log of incoming raw log messages from a data source, the windowed log being as an inference input for log anomaly detection;
   comparing statistical distribution metrics of entities in the windowed log with a statistical distribution extracted from a real-time statistical model for the entities, the entities being extracted from the incoming raw log messages and including message identifiers, log levels, error codes, and exception types;
   in response to determining the statistical distribution metrics of the entities being statistically different from the statistical distribution extracted from the real-time statistical model for the entities, tagging the windowed log as an entity anomaly;
   computing a distance between an average word embedding vector in the windowed log and a statistical distribution extracted form a real-time statistical model for word embeddings;
   in response to determining the distance being greater than a predetermined threshold of the distance, tagging the windowed log as a word embedding anomaly; and
   sending to a user an alert with an anomaly severity level.

2. The computer-implemented method of claim 1, further comprising:
   ensembling results of detecting the entity anomaly and detecting the word embedding anomaly;
   in response to determining the windowed log being tagged as either the entity anomaly or the word embedding anomaly, sending the alert with a lower severity level; and
   in response to determining the windowed log being tagged as both the entity anomaly and the word embedding anomaly, sending the alert with a higher severity level.

3. The computer-implemented method of claim 1, further comprising:
   in response to determining the statistical distribution metrics of the entities being not statistically different from the statistical distribution extracted from the real-time statistical model for the entities, tagging the windowed log as normal; and
   in response to determining the distance being not greater than the predetermined threshold of the distance, tagging the windowed log as normal.

4. The computer-implemented method of claim 1, further comprising:
   querying the incoming raw log messages from the data source;
   performing log entity extraction to obtain the entities in the incoming raw log messages;
   generating the word embedding vectors for respective ones of the incoming raw log messages;
   performing windowing for batches of the incoming raw log messages to generate windowed logs for respective ones of the batches of the incoming raw log messages;
   aggregating the entities in each of the windowed logs, such that respective ones of the entities have entity names and entity counts in each of the windowed logs; and
   averaging the word embedding vectors in each of the windowed logs, to obtain the average word embedding vector in each of the windowed logs.

5. The computer-implemented method of claim 1, further comprising:
   computing a ratio of a count of windowed logs tagged as anomalies to a total count of windowed logs in a previous time period just prior to a current time period of the log anomaly detection;
   determining whether the ratio is greater than a predetermined threshold of the ratio; and
   in response to determining the ratio being greater than the predetermined threshold of the ratio, skipping updating the real-time statistical model for the entities and the real-time statistical model for the word embeddings.

6. The computer-implemented method of claim 5, further comprising:
   in response to determining the ratio being not greater than the predetermined threshold of the ratio, retrieving the windowed logs in the previous time period;
   accumulatively computing statistical distribution metrics of the entities in the windowed logs in the previous time period; and
   updating the real-time statistical model for the entities, based on the statistical distribution metrics of the entities in the windowed logs in the previous time period.

7. The computer-implemented method of claim 6, further comprising:
   accumulatively computing statistical distribution metrics of the word embedding vectors in the windowed logs in the previous time period; and
   updating the real-time statistical model for the word embeddings, based on the statistical distribution metrics of the word embedding vectors in the windowed logs in the previous time period.

8. A computer program product for real-time statistical model based log anomaly detection, the computer program product comprising a computer readable storage medium having program instructions embodied therewith, the program instructions executable by one or more processors, the program instructions executable to:

receive a windowed log of incoming raw log messages from a data source, the windowed log being as an inference input for log anomaly detection;

compare statistical distribution metrics of entities in the windowed log with a statistical distribution extracted from a real-time statistical model for the entities, the entities being extracted from the incoming raw log messages and including message identifiers, log levels, error codes, and exception types;

in response to determining the statistical distribution metrics of the entities being statistically different from the statistical distribution extracted from the real-time statistical model for the entities, tag the windowed log as an entity anomaly;

compute a distance between an average word embedding vector in the windowed log and a statistical distribution extracted form a real-time statistical model for word embeddings;

in response to determining the distance being greater than a predetermined threshold of the distance, tag the windowed log as a word embedding anomaly; and send to a user an alert with an anomaly severity level.

9. The computer program product of claim 8, further comprising the program instructions executable to:

ensemble results of detecting the entity anomaly and detecting the word embedding anomaly;

in response to determining the windowed log being tagged as either the entity anomaly or the word embedding anomaly, send the alert with a lower severity level; and in response to determining the windowed log being tagged as both the entity anomaly and the word embedding anomaly, send the alert with a higher severity level.

10. The computer program product of claim 8, further comprising the program instructions executable to:

in response to determining the statistical distribution metrics of the entities being not statistically different from the real-time statistical model for the entities, tag the windowed log as normal; and in response to determining the distance being not greater than the predetermined threshold of the distance, tag the windowed log as normal.

11. The computer program product of claim 8, further comprising the program instructions executable to:

query the incoming raw log messages from the data source;

perform log entity extraction to obtain the entities in the incoming raw log messages;

generate the word embedding vectors for respective ones of the incoming raw log messages;

perform windowing for batches of the incoming raw log messages to generate windowed logs for respective ones of the batches of the incoming raw log messages;

aggregate the entities in each of the windowed logs, such that respective ones of the entities have entity names and entity counts in each of the windowed logs; and average the word embedding vectors in each of the windowed logs, to obtain the average word embedding vector in each of the windowed logs.

12. The computer program product of claim 8, further comprising the program instructions executable to:

compute a ratio of a count of windowed logs tagged as anomalies to a total count of windowed logs in a previous time period just prior to a current time period of the log anomaly detection;

determine whether the ratio is greater than a predetermined threshold of the ratio; and in response to determining the ratio being not greater than the predetermined threshold of the ratio, skip updating the real-time statistical model for the entities and the real-time statistical model for the word embeddings.

13. The computer program product of claim 12, further comprising program instructions executable to:

in response to determining the ratio being greater than the predetermined threshold of the ratio, retrieve the windowed logs in the previous time period;

accumulatively compute statistical distribution metrics of the entities in the windowed logs in the previous time period; and update the real-time statistical model for the entities, based on the statistical distribution metrics of the entities in the windowed logs in the previous time period.

14. The computer program product of claim 13, further comprising the program instructions executable to:

accumulatively compute statistical distribution metrics of the word embedding vectors in the windowed logs in the previous time period; and update the real-time statistical model for the word embeddings, based on the statistical distribution metrics of the word embedding vectors in the windowed logs in the previous time period.

15. A computer system for real-time statistical model based log anomaly detection, the computer system comprising one or more processors, one or more computer readable tangible storage devices, and program instructions stored on at least one of the one or more computer readable tangible storage devices for execution by at least one of the one or more processors, the program instructions executable to:

receive a windowed log of incoming raw log messages from a data source, the windowed log being as an inference input for log anomaly detection;

compare statistical distribution metrics of entities in the windowed log with a statistical distribution extracted from a real-time statistical model for the entities, the entities being extracted from the incoming raw log messages and including message identifiers, log levels, error codes, and exception types;

in response to determining the statistical distribution metrics of the entities being statistically different from the statistical distribution extracted from the real-time statistical model for the entities, tag the windowed log as an entity anomaly;

compute a distance between an average word embedding vector in the windowed log and a statistical distribution extracted form a real-time statistical model for word embeddings;

in response to determining the distance being greater than a predetermined threshold of the distance, tag the windowed log as a word embedding anomaly; and send to a user an alert with an anomaly severity level.

16. The computer system of claim 15, further comprising the program instructions executable to:

in response to determining the windowed log being tagged as either the entity anomaly or the word embedding anomaly, send the alert with a lower severity level; and in response to determining the windowed log being tagged as both the entity anomaly and the word embedding anomaly, send the alert with a higher severity level.

17. The computer system of claim 15, further comprising the program instructions executable to:
- ensemble results of detecting the entity anomaly and detecting the word embedding anomaly;
- in response to determining the statistical distribution metrics of the entities being not statistically different from the real-time statistical model for the entities, tag the windowed log as normal; and
- in response to determining the distance being not greater than the predetermined threshold of the distance, tag the windowed log as normal.

18. The computer system of claim 15, further comprising the program instructions executable to:
- query the incoming raw log messages from the data source;
- perform log entity extraction to obtain the entities in the incoming raw log messages;
- generate the word embedding vectors for respective ones of the incoming raw log messages;
- perform windowing for batches of the incoming raw log messages to generate windowed logs for respective ones of the batches of the incoming raw log messages;
- aggregate the entities in each of the windowed logs, such that respective ones of the entities have entity names and entity counts in each of the windowed logs; and
- average the word embedding vectors in each of the windowed logs, to obtain the average word embedding vector in each of the windowed logs.

19. The computer system of claim 15, further comprising the program instructions executable to:
- compute a ratio of a count of windowed logs tagged as anomalies to a total count of windowed logs in a previous time period just prior to a current time period of the log anomaly detection;
- determine whether the ratio is greater than a predetermined threshold of the ratio; and
- in response to determining the ratio being not greater than the predetermined threshold of the ratio, skip updating the real-time statistical model for the entities and the real-time statistical model for the word embeddings.

20. The computer system of claim 19, further comprising program instructions executable to:
- in response to determining the ratio being greater than the predetermined threshold of the ratio, retrieve the windowed logs in the previous time period;
- accumulatively compute statistical distribution metrics of the entities in the windowed logs in the previous time period;
- update the real-time statistical model for the entities, based on the statistical distribution metrics of the entities in the windowed logs in the previous time period;
- accumulatively compute statistical distribution metrics of the word embedding vectors in the windowed logs in the previous time period; and
- update the real-time statistical model for the word embeddings, based on the statistical distribution metrics of the word embedding vectors in the windowed logs in the previous time period.

* * * * *